United States Patent [19]

Föhl

[11] 4,394,992

[45] Jul. 26, 1983

[54] ENERGY ABSORBER FOR LOAD CARRYING FLEXIBLE PULLING MEANS

[75] Inventor: Artur Föhl, Schorndorf, Fed. Rep. of Germany

[73] Assignee: Repa Feinstanzwerk GmbH, Alfdorf, Fed. Rep. of Germany

[21] Appl. No.: 223,428

[22] Filed: Jan. 8, 1981

[30] Foreign Application Priority Data

Jan. 14, 1980 [DE] Fed. Rep. of Germany ....... 3001091

[51] Int. Cl.³ .................... A62B 35/00; B65H 75/48
[52] U.S. Cl. .................................. 242/85; 188/65.3; 188/65.4; 242/107.2; 242/75.2
[58] Field of Search ............... 242/107.2, 149, 151, 242/153, 154, 75.2, 85; 188/65.4, 65.5, 65.3, 65.2, 65.1; 280/806, 807, 808, 805; 297/470, 474–479

[56] References Cited

U.S. PATENT DOCUMENTS

| | | | |
|---|---|---|---|
| 946,588 | 1/1910 | Thuener | 188/65.4 |
| 2,684,534 | 7/1954 | Ljungberg | 242/107.2 X |
| 3,771,704 | 11/1973 | Riedel | 242/75.2 X |
| 4,027,705 | 6/1977 | Safar et al. | 242/149 X |
| 4,114,875 | 9/1978 | Deluty | 188/65.1 X |
| 4,206,886 | 6/1980 | Yoshitsugu | 242/107.2 |

*Primary Examiner*—John M. Jillions
*Attorney, Agent, or Firm*—Herbert L. Lerner; Laurence A. Greenberg

[57] ABSTRACT

Energy absorber for load carrying flexible pulling means, such as belts or ropes, especially for a safety belt system comprising (a) a rigid body
(b) a storing element for the pulling means at the body
(c) one end of the pulling means fastened to the storing element
(d) at least one non-rotatable friction roller spaced from the storing element and mounted in the body
(e) the pulling means at least partly wrapped around the friction roller
(f) a clamping element for the pulling means disposed between the storing element and the friction surface
(g) the clamping element exerting a predetermined tension force on the pulling means.

4 Claims, 3 Drawing Figures

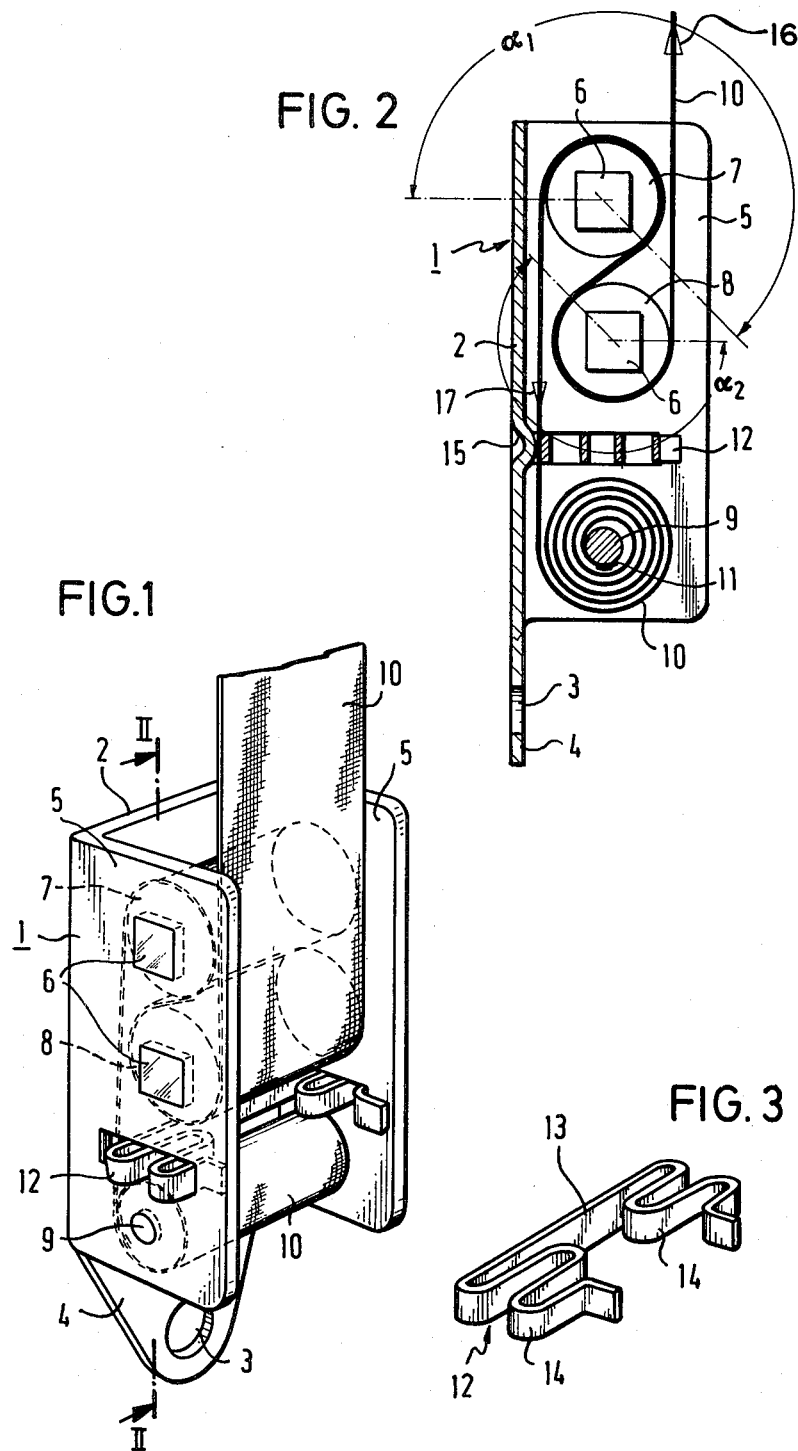

ns in which:

ENERGY ABSORBER FOR LOAD CARRYING FLEXIBLE PULLING MEANS

BACKGROUND OF THE INVENTION

1. Field of the Invention

The invention relates to an energy absorber for load carrying flexible pulling means, for example, belts or ropes, preferably for a safety belt system, comprising a friction brake around which the pulling means are at least partly wrapped around.

2. Description of the Prior Art

Braking devices for pulling means are known in which the belt is mechanically strongly clamped between clamping jaws when the braking device is activated, and thereby prevents further pull-out of the belt. With this type of clamping, the pulling means, for example, the web of the belt is locally very strongly squeezed so that after use over a period of time, or at the occurrence of very strong forces, the pulling means gets damaged at this spot, thus creating the danger that the pulling means cannot sustain extreme loads any more. Braking devices are known, in restraining systems for safety belts, wherein the belt is partially wrapped around brake rollers a few times, so that in case of activation, i.e. at the occurrence of a great load, the belt is braked by the adhesive friction between the belt surface and the roller surface. To achieve a non-slipping blocking of the belt, a great number of sequentially arranged rollers is required, resulting in a device of large size.

SUMMARY OF THE INVENTION

An object of the invention is to provide an energy absorber for load carrying, flexible pulling means of the above-mentioned kind which will avoid damage to the pulling means; is of compact construction for use in a restricted space; and allows a predetermined braking force to be obtained.

With the foregoing and other objects in view, there is provided in accordance with the invention an energy absorber for load carrying flexible pulling means, such as belts or ropes, comprising a rigid body, a storing element for the pulling means at the body with one end of the pulling means fastened to the storing element, at least one non-rotatable friction roller around which the pulling means are at least partly wrapped-around, said friction roller spaced from said storing element and mounted in said body, a clamping element for the pulling means disposed between said storing element and the friction surface of said friction roller, said clamping element clamping the pulling means to exert a predetermined tension force on the pulling means.

Other features which are considered as characteristic for the invention are set forth in the appended claims.

Although the invention is illustration and described herein as embodied in an energy absorber for load carrying flexible pulling means, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 1 is a perspective representation of the energy absorber according to the invention, showing the relationship of the two friction rollers, wind-up roller, clamping spring and body of the device, FIG. 2 is a sectional view of the energy absorber taken along line II—II of FIG. 1, and also shows the wrap-around angles of the friction rollers, and FIG. 3 shows in detail the clamp for the pulling means used in the energy absorber according to FIGS. 1 and 2.

DETAILED DESCRIPTION OF THE INVENTION

A storing element for the pulling means to which the end of the pulling means is fastened is arranged at the body or frame of the device. At least one friction roller is in fixed connection with the body of the device so that the roller cannot turn. A clamping element is provided for the pulling means which is disposed between the storing element for the pulling means and the friction surface of the friction roller, whereby the clamping element clamps the pulling means with a predetermined force. Acting on the pulling means are the combined action of the friction or band-braking effect at the friction roller, and a predetermined clamping force. The pulling means may be pulled out from the energy absorber with a uniform, constant pull-out force which likewise can be predetermined. When the storing capacity of the pulling means storing element is used up, the end of the pulling means which is preferably fastened at a wind-up roller, prevents a further pullout of the pulling means. The energy absorber according to the invention is advantageously applicable in safety belt systems, making it possible to define the forces which act on the locking or blocking mechanism. The invention can also be used advantageously in conjunction with a switching element as a safety device against overloading, whereby, after exceeding a predetermined, maximum-pulling force, an indicating device or a blocking device, or the like, are activated by means of a switching element.

According to a further development of the invention, the clamp for the pulling means is preferably constructed in the form of a spring element which can be adjusted with respect to its tension force. A form spring which is supported against the body of the device can be used as the spring element. Also, a spring system may be used which acts directly on the slideable friction roller, whereby, in the last mentioned case, the friction roller also serves as the clamping means for the pulling means at the same time. A very favorable dimensioning (size) of the energy absorber, combined with an excellent braking effect, is achieved by arranging at least two friction rollers sequentially one after the other, with each roller partially wrapped around by the pulling means.

In the following, the invention is further explained with the aid of the typical embodiment shown in the drawings.

The basic structural part of the energy absorber shown in the figures is body 1 of the device in the form of a bracket, which has a base plate 2, a bracket projection 4 in which is a fastening hole 3, and also two right angle side walls 5. Two adjacent friction rollers, or friction cylinders 7 and 8, spaced from each other, are secured in the side walls 5 by four-cornered projections 6, so that they cannot rotate. Each roller is provided with a surface layer of high frictional property. In addition, a wind-up roller 9 is rotatably supported in the side walls 5, on which roller the storage volume, i.e. the maximal pull-out length, is rolled up of a pulling means 10 in the form of a flexible band, for example a textile belt. The end 11 of the pulling means 10 is fastened to the wind-up roller 9 in known manner not further explained. The wind-up roller 9 can work in connection with a spring-activated retraction system. As shown in FIGS. 1 and 2, the pulling means 10 partially wraps around the sequentially arranged friction rollers 7 and 8, corresponding to the wrap-around angles $\alpha 1$ and $\alpha 2$. A clamp for the pulling means is arranged at the body 1 of the device between the pulling means storage element (wind-up roller 9) and the friction roller 7, which in the embodiment in FIG. 3 is made as the formed spring 12. The form-spring 12 consists of a clamping bar 13 and two spring-arms 14 at the sides, which seat at the body 1 of the device in such manner that the clamping bar 13 presses onto the clamping surface of an arched portion or embossed arch 15 of the body 1 of the device with a predetermined pre-tension- or pressure force. The pulling-means clamp can be adjusted with respect to the body 1 of the device by adjusting- or arresting elements which are not further shown, so that the pre-tension force can be thereby varied in a controlled way. The form-spring 12 clamps the pulling means 10 to the body 1 of the device with a predetermined pre-tension force. If a rope is used as the pulling means, the clamping surfaces of the arched portion and the clamping bar have a concave shape. The pulling means 10, when pulled out, in the direction of the arrow 16, must overcome the clamping force at the clamping point of the pulling means. The pull-out force 16 can be determined in advance. A holding force 17 results corresponding to the wrap-around angles $\alpha 1$ and $\alpha 2$ and the associated friction values and, this holding force is adjusted and precisely defined by the suitable dimensioning and setting of the pulling means clamp. The braking system is activated when the holding force 17 is exceeded. Thereafter, a continuous constant pull-off force will permit the pulling means 10 to be completely pulled out of its storage place.

I claim:

1. Energy absorber for a load carrying flexible belt pulling means for a safety belt system, comprising a rigid body, a wind-up roller as a storing element for the belt pulling means at the body with one end of the belt pulling means fastened to the wind-up roller, at least one non-rotatable friction roller around which the belt pulling means are partly wrapped-around, said friction roller spaced from said wind-up roller and mounted in said body, a form-spring for the belt pulling means disposed between said storing element and the friction surface of said friction roller, said form-spring fixed in the body solely to press the belt pulling means against the body to exert a predetermined tension force on the belt pulling means.

2. Energy absorber according to claim 1, wherein the form-spring presses the belt pulling means against an arched portion of the body.

3. Energy absorber according to claim 1, wherein there are at least two friction rollers arranged in sequence, which rollers are each partly wrapped around by the belt pulling means.

4. Energy absorber according to claim 1, wherein the friction roller is provided with a surface layer which has a high friction coefficient.

* * * * *